United States Patent [19]
von Haas et al.

[11] Patent Number: 4,951,578
[45] Date of Patent: Aug. 28, 1990

[54] TOOL-MOUNTING ASSEMBLY

[75] Inventors: Rainer von Haas, Geesthacht; Günter Ruther, Marl, both of Fed. Rep. of Germany

[73] Assignee: Krupp Widia GmbH, Essen, Fed. Rep. of Germany

[21] Appl. No.: 433,534

[22] Filed: Nov. 8, 1989

[30] Foreign Application Priority Data

Nov. 11, 1988 [DE] Fed. Rep. of Germany ....... 3838318

[51] Int. Cl.$^5$ ........................................... B23Q 11/00
[52] U.S. Cl. ..................................... 409/136; 408/56; 409/137; 409/231; 409/232
[58] Field of Search ............... 409/135, 136, 137, 231, 409/232, 233, 134; 408/56, 57, 59, 16; 279/2 R

[56] References Cited

U.S. PATENT DOCUMENTS

| | | | |
|---|---|---|---|
| 3,603,203 | 9/1971 | Rhodes | 409/232 |
| 3,691,899 | 9/1972 | Antonietto et al. | 409/232 |
| 4,320,999 | 3/1982 | Briese | 408/59 |
| 4,787,785 | 11/1988 | Hiller et al. | 409/233 |
| 4,864,714 | 9/1989 | Von Haas et al. | 409/137 |

FOREIGN PATENT DOCUMENTS

| | | |
|---|---|---|
| 3423060 | 1/1986 | Fed. Rep. of Germany . |
| 8437207 | 3/1986 | Fed. Rep. of Germany . |
| 3722197 | 1/1989 | Fed. Rep. of Germany . |
| 140998 | 12/1978 | German Democratic Rep. . |
| 114878 | 9/1979 | Japan ..................................... 408/57 |
| 71742 | 5/1982 | Japan ..................................... 409/231 |
| 118407 | 6/1985 | Japan ..................................... 408/56 |
| 60-34245 | 7/1985 | Japan . |
| 61-50738 | 7/1986 | Japan . |

OTHER PUBLICATIONS

Article "Ein Sicherer Weg Zum Vollautomatischen Werkzeugswechsel", Publication Fertigungstechnik.

Primary Examiner—Daniel W. Howell
Attorney, Agent, or Firm—Herbert Dubno; Ronald Lianides

[57] ABSTRACT

A tool holder system for stationary or rotatable tool holders in machine tools with manual or automatic tool change, has a tool holder provided with a mechanism for locking the tool head onto clamping surfaces, and integrated liquid coolant supply and a compressed air supply to the clamping surfaces. At the clamping end of the tool holder, a checkvalve is provided in the air supply passage to block incursion of liquid coolant even at high pressures of the latter and thus prevent corrosion and damage which may result from such corrosion.

16 Claims, 3 Drawing Sheets

FIG.1

TOOL-MOUNTING ASSEMBLY

FIELD OF THE INVENTION

Our present invention relates to a mounting assembly or system in which a tool head, e.g. for a machine tool, can be replaceably mounted in a tool holder having a tool clamping mechanism and a coolant feed arrangement integrated therewith.

BACKGROUND OF THE INVENTION

A modular tool-mounting assembly or system having a clamp device integrated into the tool holder and an integrated coolant feed arrangement is described, for example, in German Patent Document DE-GM 84 37 207. This system is provided, for example, for a numerically controlled machine tool utilizing a tool change system and comprises basically a tool holder having a clamping device in which a tool head can be replaceably mounted. The tools themselves may be cutting tools of various types, all of which can be provided with such heads so that they can be interchangeably affixed to the tool holder and clamped by the clamping mechanism. The tool system also includes an integrated cooling-medium feed so that a liquid coolant can be fed through the tool head to the cutting location.

Machine tools of a variety of types can be provided with the tool system of the above-mentioned German Patent Document and equipped with automated tool change units. The tool head, for example, can be engaged in a swivel arm which operates independently of the machine tool and can carry the tool head and a respective tool to the tool holder or away from the latter. During the tool change process, coupling and clamping surfaces between the holder and the tool head can become contaminated by chips or other contaminants and these contaminants can then interfere with the fit of the new tool head onto the holder. In some cases, the new tool head cannot be mounted properly or positioned with the desired degree of precision. A reliable and problem-free operation of the machine tool cannot be ensured where such contamination is a problem and manufacturing operations can be interfered with.

Known tool systems utilizing an integrated coolant assignment, may have the disadvantage that the coolant is a corrosive medium. In cases in which some coolant may remain on the holder during and after a tool replacement operation, in the long term problems can be created because of local corrosion resulting from such retention. In this case as well, a reliable and problem-free operation of the machine tool cannot be ensured.

To clean the coupling region between the tool head and the tool holder in a technologically simple manner and especially where there may be some residual coolant or flow during the technology, it has already been proposed to additionally provide in the coupling region, a compressed air flow. The pressurized air passages open at the coupling region between the tool head and the tool holder.

This latter tool system has the advantage that it integrates a cleaning arrangement with the tool holder so that the coupling region between the tool head and the tool holder can be cleaned in a sample manner so that contaminants will not collect in regions where they will interfere with the mounting of a new tool head in the aforedescribed manner.

The pressurized air can blow away chips and other contaminants which may otherwise fall into or onto the coupling surfaces to contaminate the latter. During the tool replacement operation, coolant losses can be precluded by cutting off the coolant flow.

Consequently, an integrated pressurized air cleaning can ensure reliable and trouble-free operation of the machine without the danger of interruption of automatic fabrication and machining processes. The cleaning device can be used both for the tool systems having stationary tools and for the systems utilizing rotating tools.

For effective use, it is merely important to ensure that the pressurized air sweeps all of the coupling and clamping surfaces and thus reaches all such surfaces to blow away the contaminants.

However, it has been found that, with the latter system, coolant can penetrate into the compressed air passages and can act corrosively therein. This can on a long-term basis, provide a serious problem. The problem is heightened by the fact that customary coolant pressures can be as high as 160 bar.

It may be advisable to mention briefly a number of other prior art systems as well.

In German Patent Document 34 23 060, for example, a system is de which does integrate a pressurized air arrangement with a coolant flow arrangement in a tool holder. However, in this case, the air supply is blocked only when a piston remote from the region at which the air is directed at the coupling surfaces is moved into a blocking position, this piston being provided on a part separate from the holder itself and certainly remote from the coupling surfaces so that the drawback of possible passage of corrosive coolant into the pressurized air ports and channels applies to this system as well.

The publication "Ein sicherer Weg zum vollautomatischen Werkzeugwechsel" in "Fertigungstechnik" describes the supply to a Hirth-tooth arrangement of either compressed air or coolant for cleaning in conjunction with tool change.

The problem described above is applicable here as well.

Reference may also be had to tool holder systems found in German Democratic Republic Pat. No. 140 998 and in the Japanese Patent Abstracts JP 60 34 245A and JP 61 50 738.

German Patent Document 37 22 197 describes the use of compressed air for cleaning coupling surfaces, but does not deal with the problem attacked by the instant invention, although it does describe the use of back pressure in the compressed air line as signalling for the locked state of the tool head.

OBJECTS OF THE INVENTION

It is, therefore, the principal object of the present invention to provide an improved tool holder system or assembly with an integrated coupling device and coolant supply which also provides for pressurized cleaning of the coupling surfaces, but wherein the danger of corrosion of the pressurized air passages is avoided.

Another object of the invention is to provide an improved tool holder system of the type described which will be free from the drawbacks of the prior art arrangements.

SUMMARY OF THE INVENTION

These objects and others which will become apparent hereinafter are attained, in accordance with the present invention, by providing a checkvalve in the pressurized air passage proximal to the outlet thereof at the coupling surfaces and oriented to prevent, even under the substantial pressures with which the coolant can be supplied, penetration of coolant into the pressurized air passage beyond the checkvalve, thereby preventing corrosion and associated damage.

By the use of this checkvalve, even with coolant pressures up to 160 bar, coolant can be prevented from passing the checkvalve. Since the air passages extend directly into the machine tool itself, the danger of penetration of coolant into the machine tool through the air passages is precluded.

More particularly, the tool holder system or assembly of the invention can comprise:

- a tool holder for a machine tool formed with a receiver for a tool head;
- a tool head replaceably fitted on the receiver;
- a coupling mechanism on the tool holder at the receiver engaging the tool head and clamping same on the receiver;
- a liquid coolant passage formed in the tool holder and communicating with the tool head at the receiver for delivering the coolant to a machining location at an elevated pressure;
- means forming a pressurized air passage in the holder opening in a region of the receiver for delivering air under pressure to a region at which the tool head is coupled to the holder for carrying away chips and other contaminants on surfaces of the tool holder to be contacted by a tool head; and
- a checkvalve in the pressurized air passage on the tool holder and oriented to prevent flow of the coolant into the pressurized air passage.

Advantageously, the checkvalve has a valve ball biased by a spring against a valve seat. A checkvalve of this type has proved to be most satisfactory in practice and is easily accessible, provides a large open cross section during air blast cleaning of the surfaces and can satisfactorily block backflow of high pressure coolant into the air passages.

The checkvalve is preferably so oriented that when a rotating tool holder is provided, centrifugal force acting upon the ball will additionally bias it against the seat.

This has been found to be highly advantageous when the tool holder is a rotating spindle of the machine tool. At higher speeds the sealing effectiveness is correspondingly increased and hence the reliability of the checkvalve during the machining operation is enhanced.

It has been found to be advantageous to provide the passage in the region at which it opens onto the coupling surfaces with an inclined orientation such that a radial component is imparted to the air flow.

With this orientation, of course, any liquid which does enter the air passage between the mouth and the checkvalve will likewise receive a radial component of force outwardly upon application of the centrifugal force and rotation of the spindle. This radial outward force also reduces the tendency for coolant to enter the air passage or accumulate therein and thereby further reduces the corrosion danger. The checkvalve is also relieved of pressure from the coolant in this case.

It has been found to be advantageous to provide the pressurized air line with a sensor device responsive to back pressure and thus is capable of signalling the clamping of the tool head in its desired position. The sensor provides function control in a simple manner since, once the tool head is clamped against the holder, the outlets for the pressurized air can be be blocked to permit a back pressure to develop. If the tool head is not properly position, of course, air will continue to escape from the passage and the desired level of back pressure will not be reached. Function control in this manner is desirable both for an automatic tool change and for a manually effected change.

Uniform cleaning of the coupling region between the tool head and tool holder is ensured by providing the pressurized air passage with an annular distributor which distributes the pressurized air to a plurality of outlets spaced around the surface.

BRIEF DESCRIPTION OF THE DRAWING

The above objects, features and advantages of our invention will become more readily apparent from the following description, reference being made to the accompanying drawing in which:

FIG. 1 is a schematic cross-sectional view illustrating a first embodiment of the invention;

SPECIFIC DESCRIPTION

Figure 1:
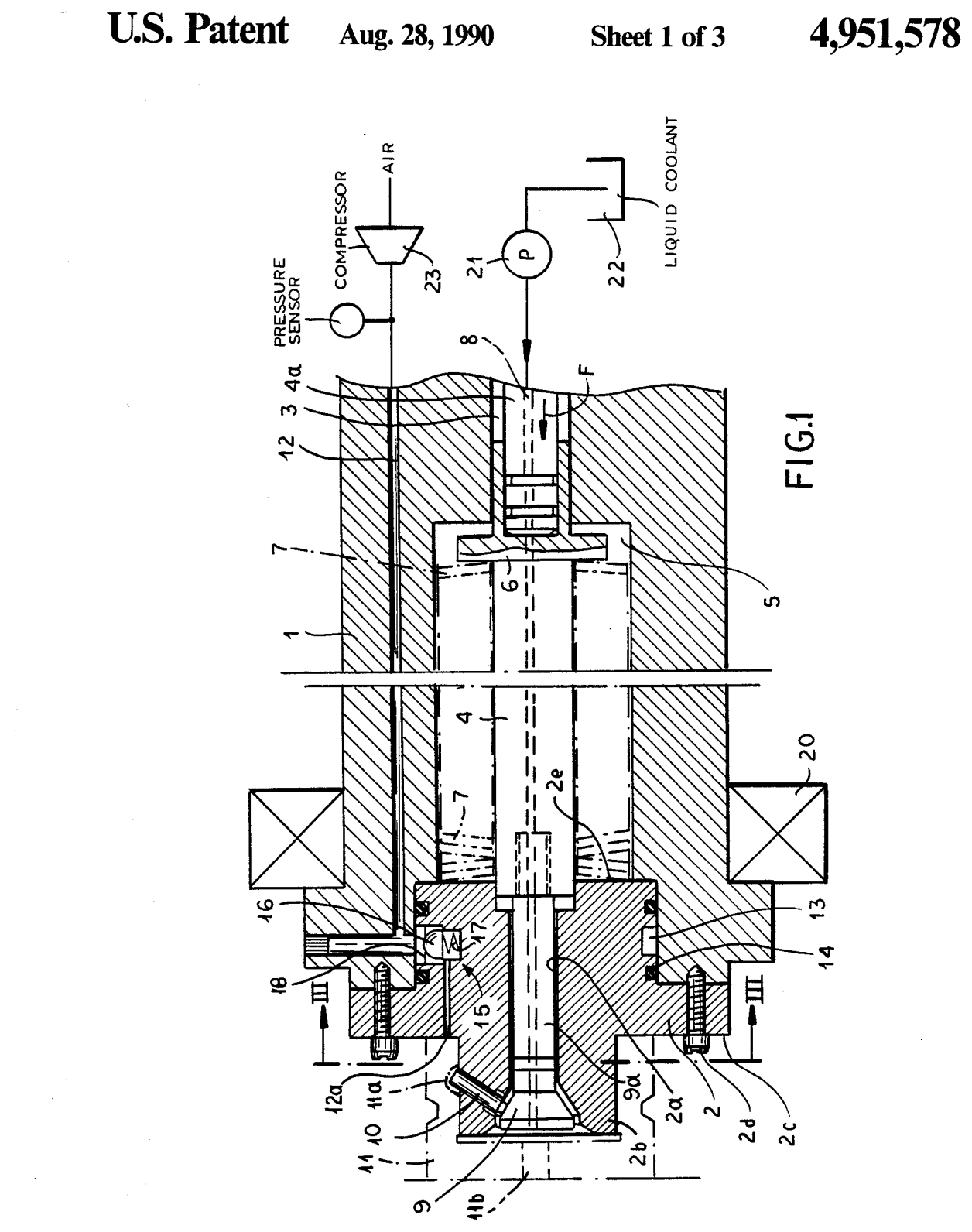
Figure 2:
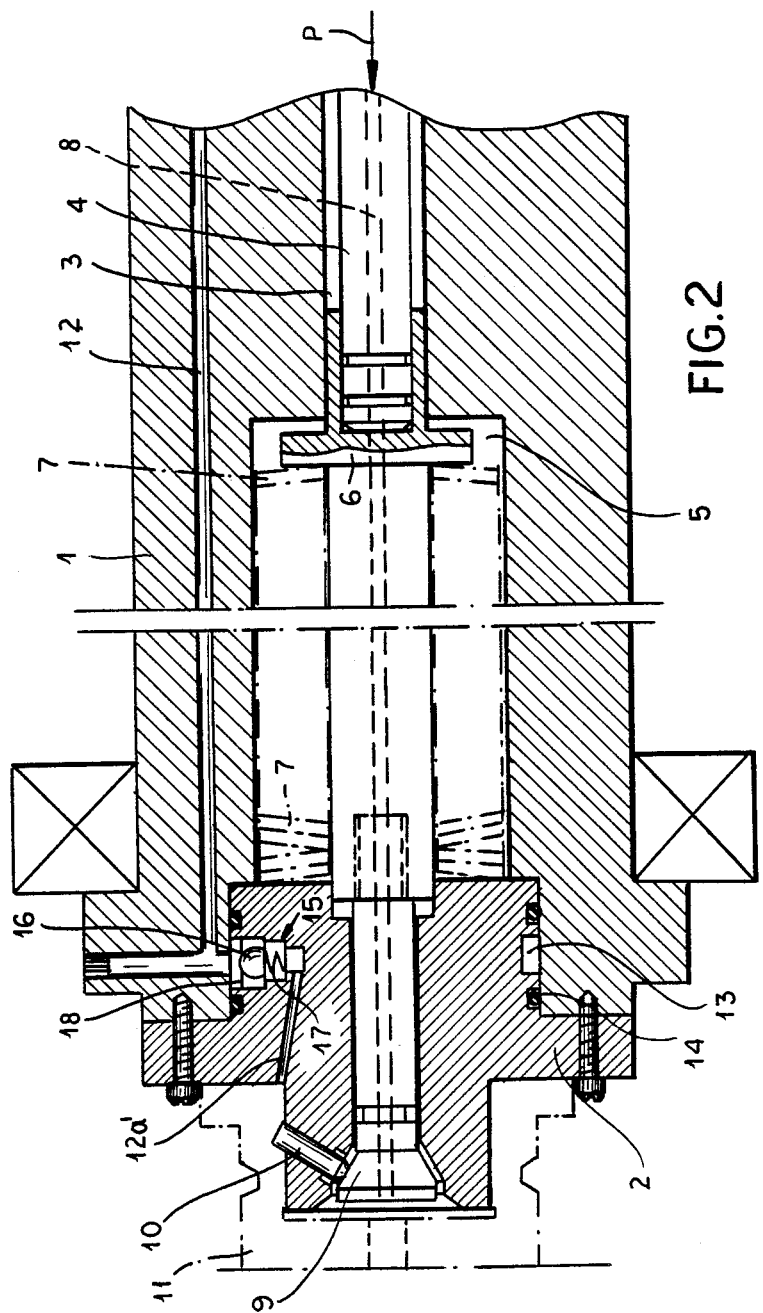
FIG. 2 is a similar view of a second embodiment.

The tool system shown in FIG. 1 comprises a tool holder 1 which is here shown to be a rotary spindle as indicated by a bearing 20 in which that spindle is journaled. Note that the distributor means for delivering the fluids to the holder have not been shown and are conventional in the art.

At the left-hand end of this holder, a tool holder head 2 is attached by screws 2d. The tool holder 1 and the tool holder head 2 have a central receiving bore 3 in which a tension rod 4 is longitudinally shiftable. The tension rod 4 is provided with an annular flange or disk 6 forming one seat for a stack of disk springs or belville springs 7, the stack being braced against a wall 2e of the tool holder head 2 which forms one end of a cavity 5 in the tool holder 1.

As a consequence, the tension rod 4 is urged to the right by the precompressed stack of spring 7. A pusher 4a can be displaced to the left with a force F sufficient to overcome the force of the spring stack to drive the tension rod 4 to the left and entrain in this direction the stem 9a of a clamping head 9.

Through the rod 4, the stem 9a and the pusher 4a, an axial bore 8 can extend to constitute a coaxial liquid coolant supply passage opening at the end of the frustoconical clamping head 9. The passage formed by the bore 8 is connected to a high-pressure pump 21 supplying the liquid coolant from a reservoir 22 into which filtered coolant may be fed from a collection pan if the coolant is to be recirculated.

The conical periphery of the clamping head 9 is engageable with a plurality of clamping pins 10 which are guided in an inclined rearwardly outwardly configuration as shown in FIG. 1, in the boss 2b of the holder head 2 which is formed with a central bore 2a receiving the stem 9a with clearance.

When the pins 10 are cammed outwardly by the frustoconical surface of the clamping head 9, these pins can engage in recesses 11a in a tool head 11 fitting over the boss 2b and coming to abut the surface 2c of the holder head 2.

The tool head 11 can carry a cutting tool, drill bit or the like. The spring force of the stack of disk springs 7 thus serves to hold the pins 10 outwardly and firmly clamp the head 11 onto the tool holder 1, 2.

To release the tool, the rod 4 is shifted to the left in the direction of arrow F, e.g. by the pusher 4a driven by a hydraulic cylinder or the like to relieve the spring force and displace the head 9 to the left. The pins 10 can then be displaced inwardly into the boss 2b and the tool head 11 can be removed and replaced either by an automatic tool changing unit or by hand.

In the absence of the force F, the spring force acting in the opposite direction maintains the pins 10 in their locking positions shown in FIG. 1 to retain the tool head 11 against the seats, e.g. the seat 2c, formed by the holder head 2.

As is also apparent from FIG. 1, when the tool head 11 is in place, the high-pressure coolant can pass through the bore 8 and the locking mechanism 9, etc. through a bore 11b in the tool head 11 to the cutting location.

In parallel to the coolant path 8, the holder 1 is provided with a compressed air passage 12 which may derive from an air compressor 23.

This passage 12 opens into an annular channel 13 formed in the holder head 2 and axially flanked by O-rings 14 which serve to seal the channel.

Figure 3:
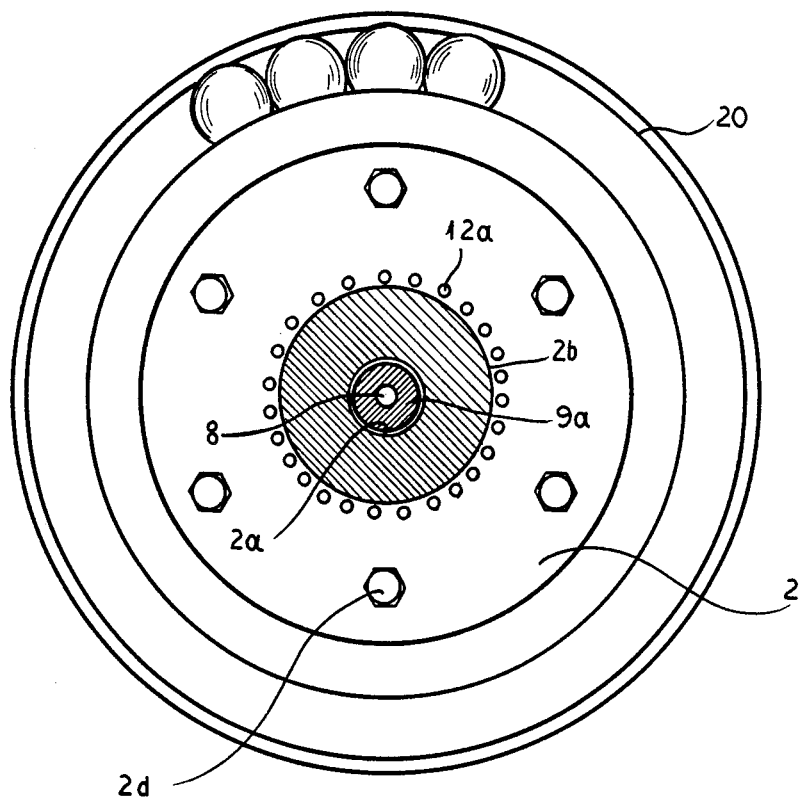
FIG. 3 is a cross-sectional view taken along the line III—III of FIG. 1.

From this annular channel 13, the compressed air is delivered via the additional passages 12a (see FIG. 3) uniformly around the boss 2b to the clamping surfaces 2c, etc. at which the tool head 11 engages the holder head 2. In this embodiment, the passages 12a downstream from a checkvalve 15 extend parallel to the axis of the tool system.

As is also apparent from FIG. 1, the compressed air passage 12 is provided with the checkvalve 15 immediately adjacent the annular channel 13 and at the end of the holder 1 formed with the mounting surfaces 2c, etc. receiving the tool head 11, i.e. close to the locations at which the bores 12a open at the mounting or clamping surfaces.

The checkvalve 15 can comprise a ball 16 urged by the spring 17 against a valve seat 18.

The compressed air is fed through the passage 12, the ball 16 is displaced in opposition to the force direction of the spring 17 away from the seat 18 so that the compressed air can pass the checkvalve and be emitted from the front end of the tool holder head 2.

However, the checkvalve 15 prevents coolant from the passage formed by the bore 8 at a pressure of say 160 bar from penetrating into the passage 12 and hence the machine tool to create corrosion problems. The compressed air supply thus provides a cleaning system and means by which the coupling surfaces between the tool head 11 and the tool holder 1 or its head 2 are cleaned by an air blast upon a tool replacement. The compressed air is supplied just before a new tool head 11 is mounted upon the holder head 2 to blow away chips and other contaminants. This ensures that the tool head 11 can fit precisely and reliably on the cleaned surfaces and ensures a reliable and trouble-free operation of the machine tool.

The embodiment of FIG. 2 differs from that of FIG. 1 only in the path of the downstream portions of the air passages, i.e. the bores 12a. In this embodiment, these bores extend at an outward inclination with respect to the axis. Thus when the holder is set in rotation, centrifugal force will limit the entry of liquid from the coolant bore 8 into the bores 12a', will displace liquid which may be in these bores and will prevent the collection of liquid in these bores and corrosive attack.

In both embodiments, the radial orientation of the checkvalve 15 ensures that the centrifugal force will augment the force of spring 17 as well.

We claim:

1. A tool-mounting assembly comprising:
    a tool holder for a machine tool formed with a receiver for a tool head;
    a tool head replaceably fitted on said receiver;
    a coupling mechanism on said tool holder at said receiver for engaging said tool head and clamping same on said receiver;
    a liquid coolant passage formed in said tool holder and communicating with said tool head at said receiver for delivering a coolant to a machining location at an elevated pressure;
    means forming a pressurized air passage in said holder opening in a region of said receiver for delivering air under pressure to a region at which said tool head is coupled to said receiver for carrying away chips and other contaminants on surfaces of said tool holder to be contacted by said tool head; and
    a checkvalve in said pressurized air passage on said tool, holder to prevent flow of said coolant into said pressurized air passage.

2. The assembly defined in claim 1 wherein said checkvalve includes a valve seat and a valve member spring biased toward said seat and engageable therewith.

3. The assembly defined in claim 2 wherein said valve member is a ball.

4. The assembly defined in claim 3 wherein said holder is rotatable about a longitudinal axis thereof and said checkvalve is positioned so that centrifugal force generated by rotation of said holder is effective in the same direction as spring bias on said ball to urge ball against said seat.

5. The assembly defined in claim 4 wherein said pressurized air passage is inclined at an angle to said axis and opens at said region for imparting a radial component to the velocity of pressurized air flowing from said pressurized air passage.

6. The assembly defined in claim 4 wherein said pressurized air passage is disposed at a location downstream of said checkvalve and inclined to said axis for imparting a radial component to the velocity of pressurized air flowing therefrom.

7. The assembly defined in claim 3 wherein said pressurized air passage is formed with a pressure sensor responsive to the development of a static pressure therein upon mounting of a tool head on said receiver to signal proper positioning and clamping of a tool head on said holder.

8. The assembly defined in claim 3 wherein said pressurized air passage is formed with an annular distribution channel downstream of said checkvalve.

9. The assembly defined in claim 3 wherein said holder is . provided with a body constituting said receiver and bolted to said holder at an end thereof, said coupling mechanism including at least one outwardly displaceable clamping element engageable in said tool head, a tension rod formed with an inclined surface acting upon said clamping element, a stack of disk springs in said holder biasing said tension rod in a direction urging said element outwardly, and a plunger extending axially into said holder from an end thereof opposite the end provided with said body and bearing upon said rod for displacing same axially in an opposite direction to release said tool head from said receiver.

10. The assembly defined in claim 9 wherein said liquid coolant passage is constituted by axially communicating bores in said rod and said plunger.

11. The assembly defined in claim 10 wherein said pressurized air passage includes a bore delivering pressurized air to said check valve extending parallel to said liquid coolant passage.

12. The assembly defined in claim 11 wherein said checkvalve is formed in said body adjacent a location at which said body abuts said holder.

13. The assembly defined in claim 12 wherein said holder is rotatable about a longitudinal axis thereof and said checkvalve is positioned so that centrifugal force generated by rotation of said holder is effective in the same direction as spring bias on said ball to urge said ball against said seat.

14. The assembly defined in claim 13 wherein a portion of said pressurized air passage in said receiver is inclined to said axis at a location at which it opens in said region to impart a radial component to the velocity of pressurized air flowing from said pressurized air passage.

15. The assembly defined in claim 14 wherein said pressurized air passage is disposed at a location downstream of said checkvalve.

16. The assembly defined in claim 15 wherein said pressurized air passage is formed with a pressure sensor responsive to the development of a static pressure therein upon mounting of a tool head on said receiver to signal positioning and clamping of a tool head on said holder.

* * * * *